United States Patent
Martinez

(10) Patent No.: US 7,954,201 B1
(45) Date of Patent: Jun. 7, 2011

(54) MOBILE MOUNTED STEAM CLEANING SYSTEM

(76) Inventor: Jaime Martinez, West Allis, WI (US)

( * ) Notice: Subject to any disclaimer, the term of this patent is extended or adjusted under 35 U.S.C. 154(b) by 0 days.

(21) Appl. No.: 12/627,859

(22) Filed: Nov. 30, 2009

(51) Int. Cl.
*E01H 1/08* (2006.01)
*A47L 7/00* (2006.01)

(52) U.S. Cl. ............................ 15/340.1; 15/320; 15/321

(58) Field of Classification Search ............... 15/340.1, 15/320, 321
See application file for complete search history.

(56) References Cited

U.S. PATENT DOCUMENTS

| | | | |
|---|---|---|---|
| 3,680,786 A | 8/1972 | Levy | |
| 4,109,340 A | 8/1978 | Bates | |
| 4,158,248 A | 6/1979 | Palmer | |
| 4,207,649 A * | 6/1980 | Bates | ............. 15/319 |
| 4,244,079 A | 1/1981 | Bane | |
| 4,284,127 A | 8/1981 | Collier et al. | |
| 4,443,909 A | 4/1984 | Cameron | |
| 4,862,551 A | 9/1989 | Martinez et al. | |
| 4,940,082 A | 7/1990 | Roden | |
| 4,949,424 A | 8/1990 | Shero | |
| 5,165,139 A | 11/1992 | Oxman | |
| 5,287,589 A * | 2/1994 | Hughes | ............. 15/321 |
| 5,469,598 A | 11/1995 | Sales | |
| 5,950,273 A | 9/1999 | Suhaka et al. | |
| 6,082,630 A | 7/2000 | Bohrer et al. | |
| 6,182,328 B1 | 2/2001 | Roden et al. | |
| 6,675,437 B1 | 1/2004 | York | |
| 7,191,489 B1 * | 3/2007 | Heath | ............. 15/320 |
| 7,216,397 B1 | 5/2007 | Tanner | |
| 2004/0118439 A1 | 6/2004 | Durrant et al. | |
| 2004/0134649 A1 | 7/2004 | Richarson et al. | |

* cited by examiner

*Primary Examiner* — Dung Van Nguyen
(74) *Attorney, Agent, or Firm* — Absolute Technology Law Group, LLC

(57) ABSTRACT

A sliding track steam cleaning system which may be installed on a vehicle. van, mini-van or automobile having a combined cargo and passenger area of approximately 20 cubic feet and need not be specially adapted for mounting on a truck.

4 Claims, 4 Drawing Sheets

MOBILE MOUNTED STEAM CLEANING SYSTEM

FIELD OF INVENTION

This invention relates generally to the field of steam cleaning systems in other embodiments, and in particular to a sliding track steam cleaning system which may be installed on a vehicle.

GLOSSARY

As used herein, the term "vacuum blower" refers to any element or system that extracts water from carpeting, tile, glass, stainless steel, vinyl, plastic, etc., in the steam cleaning process.

As used herein, the term "exhaust fan" refers to any device used to produce airflow and designed to move heated air out of an enclosure. An exhaust fan may be powered by electrical, battery, solar or other means known in the art.

As used herein, the term "recovery tank" refers to any tank of variable sizes designed to be secured in a vehicle as used herein to hold liquids.

As used herein, the term "heater" refers to any water heater known in the art, such as those manufactured by, e.g., Little Giant® Manufacturing Co., Inc., and powered by a propane tank or electric power.

As used herein, the term "clean solution tank" refers to a tank specifically manufactured and configured for use with a vehicle as used herein with a mobile mounted steam system, designed to hold 40-70 gallons of a mixture of water and cleaning solution.

As used herein, the term "propane tank" refers to any conventional propane tank known in the art that can, for instance, provide gas to a heater as used herein.

As used herein, the term "reel assembly" refers to an object around which lengths of another material, such as hose, are wound for storage; may be mechanically or manually operated; and may be designed for various placement inside or outside of, a vehicle as used herein.

As used herein, the term "sliding track mount" refers to any supporting element which is secured to the frame of a vehicle as used herein with bolts, welding, machining, clamping, or any other securing means known in the art, and serves to support various components on a frame may contain a track as used herein.

As used herein, the term "inverter" refers to any electro-mechanical device that converts mechanical energy to alternating current electrical energy and is capable of providing electrical power to another component, such as a vacuum blower.

As used herein, the term "cat pump" refers to any device that creates pressure for the steam cleaning process, as known in the art, by pumping water and providing water pressure.

As used herein, the term "two cycle engine" refers to any commercially available two cycle engine known in the art as manufactured by, e.g., Kohler Company or Briggs and Stratton Corporation.

As used herein, the term "silencing means" refers any device or structural modification to reduce air discharge noise from a vacuum blower, as used herein, such as a muffler, sound proof encasement, padding blower silencers as known in the art, and/or other structural modifications to reduce vibrations and sound, or any other silencing means known in the art.

As used herein, the term "pressure hose" refers to a hose designed for use in cleaning surfaces (e.g. constructed from any rubber, plastic or synthetic material which can be adapted for forming a hose) that transfers cleaning solution and steam to carpet, upholstery and other surfaces during the steam cleaning process, as known in the art.

As used herein, the term "vacuum hose" refers to a hose designed for use in cleaning surfaces (e.g. constructed from any rubber, plastic or synthetic material which can be adapted for forming a hose) that extracts water and cleaning solution from carpet, upholstery and other surfaces during the steam cleaning process, as known in the art.

As used herein, the term "propane tube" refers to any connecting tube or hose as known in the art that is capable of maintaining gas flow from propane tank to another component when attached.

As used herein, the term "drying fan" refers to any movable device used to produce airflow, which may be powered by electrical, battery, solar or other means known in the art.

As used herein, the term "frame legs" refers to steel- or other large-load bearing material extensions of sliding track mount, as used herein, which can be extended and secured against pavement or ground to provide a carrying surface parallel to that of the sliding track mount, and may contain a track as used herein.

As used herein, the term "modified door" refers to a side door which is adapted to allow access to interior equipment of a mobile mounted steam system as used herein, and may be a sliding door, a large OEM door, or any other door known in the art.

As used herein, the term "back door" refers to a back door which is adapted to allow access to equipment in the rear of a mobile mounted steam system, as used herein, and may be a set of cargo doors, a hatch-back door, a side-hinged door, or any other door known in the art.

As used herein, the term "track" refers to any sliding guide system capable of moving heavy loads, such as a side mount linear guide system as manufactured by Danaher Motion.

As used herein, the term "sheet metal cover" refers to an object or objects that completely encases components present on a sliding track mount, as used herein. A sheet metal cover may be made of steel or other metals capable of being thin-cut, hard plastics, composites or synthetics, and may contain various interlocking and movable panels.

DETAILED DESCRIPTION OF EMBODIMENTS OF THE INVENTION

Figure 1:
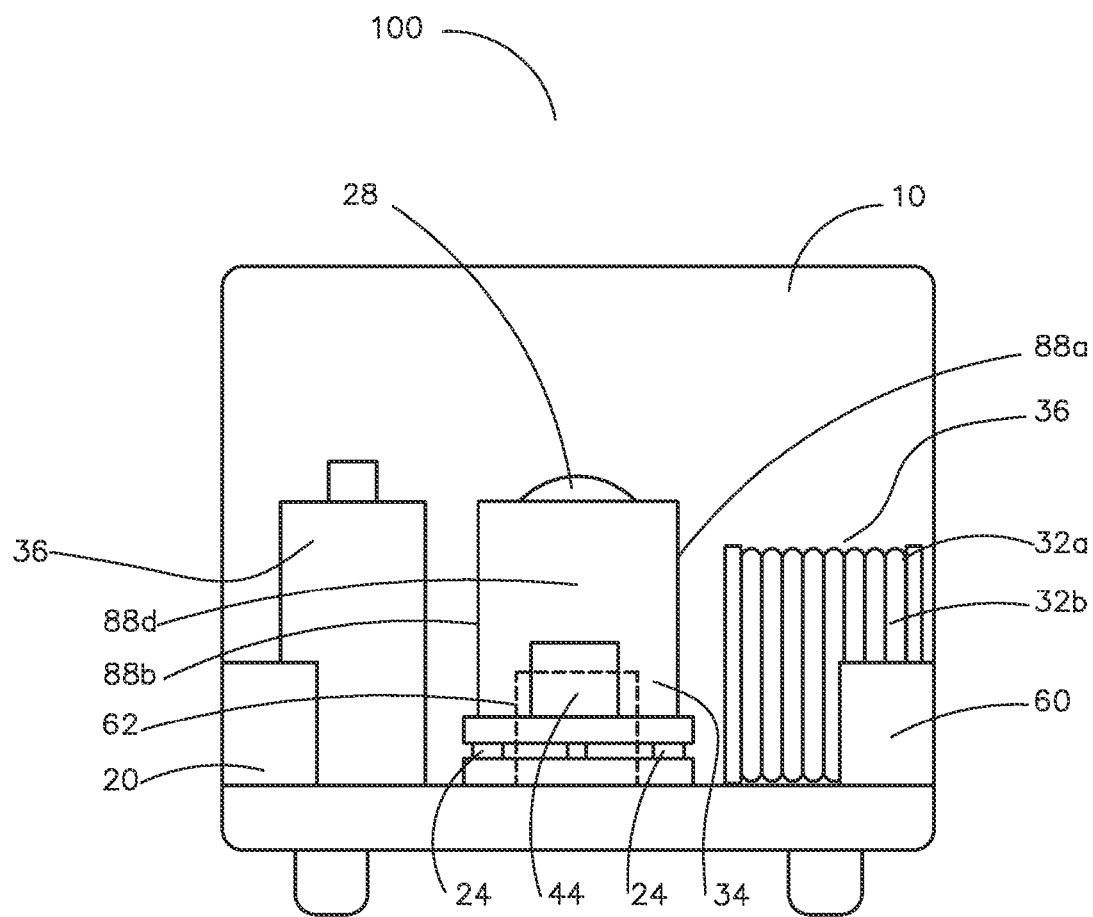
FIG. 1 shows a sectional rear view of one embodiment of the mobile mounted steam system.

For the purpose of promoting an understanding of the present invention, references are made in the text to embodiments of a mobile mounted steam system to clean vehicles, only some of which are described herein. It should be understood that no limitations on the scope of the invention are intended by describing these exemplary embodiments. One of ordinary skill in the art will readily appreciate that modifications such as the dimensions of a mobile mounted steam system to clean vehicles, alternate but functionally similar material(s) from which the mobile mounted steam system to clean vehicles is made. The inclusion of additional elements may be deemed readily apparent and obvious to one of ordinary skill in the art, and all equivalent relationships to those described in the written description do not depart from the spirit and scope of the present invention. Some of these possible modifications are mentioned in the following description. Therefore, specific details disclosed herein are not to be interpreted as limiting, but rather as a basis for the claims and as a representative basis for teaching one of ordinary skill in the art to employ the present invention in virtually any appropriately detailed apparatus or manner.

It should be understood that the drawings are not necessarily to scale, emphasis instead being placed upon illustrating the principles of the invention. In addition, in the embodiments depicted herein, like reference numerals in the various drawings refer to identical or near identical structural elements.

Moreover, the term "substantially" or "approximately" as used herein may be applied to modify any quantitative representation that could permissibly vary without resulting in a change in the basic function to which it is related. For example, one embodiment of the mobile mounted steam system to clean vehicles as disclosed herein may be comprised of a single multi-dimensional and/or textured component, while others may include multiple multi-dimensional and/or textured component.

FIG. 1 shows a sectional rear view of an exemplary embodiment of mobile mounted steam system 100, which generally includes two-cycle engine 34, vacuum blower 28, exhaust fan 44, heater 36, clean solution tank 60, propane tank 62 (shown in phantom in FIG. 1 and also shown in FIGS. 2 and 3) and reel assembly 38. In the embodiment in FIG. 1, mobile mounted steam system 100 is adapted for use in vehicle 10. In them embodiment shown, vehicle 10 is a Chevrolet HHR as manufactured General Motors Corporation. However, in other embodiments, vehicle 10 may be any van, mini-van or automobile having a combined cargo and passenger area of approximately 20 cubic feet, and need not be a specially adapted truck.

In the embodiment shown, mobile mounted steam system 100 contains sliding track mount 24. In the embodiment shown, sliding track mount 24 is bolted to the frame of vehicle 10 using four one-half inch bolts, but can secured by welding, machining or clamping, or any other securing means known in the art. Various embodiments may have more or fewer bolts, and various configurations and combinations of bolts and securing means.

In the embodiment shown, sliding track mount 24 is a movable steel frame placed centrally within the frame of vehicle 10. In the embodiment shown, sliding track mount 24 supports inverter 26 (shown in FIG. 2), vacuum blower 28, cat pump 30 (shown in FIG. 2), and two-cycle engine 34.

In the exemplary embodiment in FIG. 1, two-cycle engine 34 is a commercially available two cycle engine known in the art as manufactured by Kohler Company or Briggs and Stratton Corporation (e.g., the Kohler 18 hp Command Series Engine).

In alternate embodiments of mobile mounted steam system 100, any commercially available or specially manufactured engine of at least fourteen (14) horsepower may be used, with engines in various embodiments having smaller dimensions. Two-cycle engine 34 runs vacuum blower 28, inverter 26 (shown in FIG. 2) and cat pump 30 (shown in FIG. 2), and includes oil filter (not shown) and air filter (not shown) which are made easily accessible for changing by right panel 88b and left panel 88a, back panel 88c, front panel 88d (not visible, shown in FIG. 2) and top panel 88e (not visible, shown in FIG. 4), all part of sheet metal cover 50 (shown in FIG. 2). When heat is generated by two-cycle engine 34 during use of mobile mounted steam system to clean vehicles 100, exhaust fan 44 may be engaged to release heat through the floor of vehicle 10.

In the embodiment shown in FIG. 1, sliding track mount 24 also includes vacuum blower 28. Vacuum Blower 28 is a tool for extracting water from carpeting or other materials in the steam cleaning process. In the embodiment shown, vacuum blower 28 is a commercially available vacuum blower known in the art, such as that available from Dresser, Inc. In various embodiments of mobile mounted steam system 100, vacuum blower 28 may include silencing means 46 (not visible, shown in FIGS. 2 and 3) such as muffler, a sound proof encasement, padding, blower silencers as known in the art, and/or structural modifications to reduce vibrations and sound.

In the exemplary embodiment shown in FIG. 1, inverter 26 is a 26 amp inverter that provides electrical power to vacuum blower 28 which may be commercially available and/or specially manufactured and configured.

FIG. 1 further illustrates recovery tank 20. Recovery tank 20 holds waste water until a user can expel it in an appropriate location using dump valve 22 (not visible, shown in FIGS. 2 and 3). The dump valve is any aperture or valve which releases waste water (which has been suctioned by vacuum blower 28) from the recovery tank.

Figure 2:
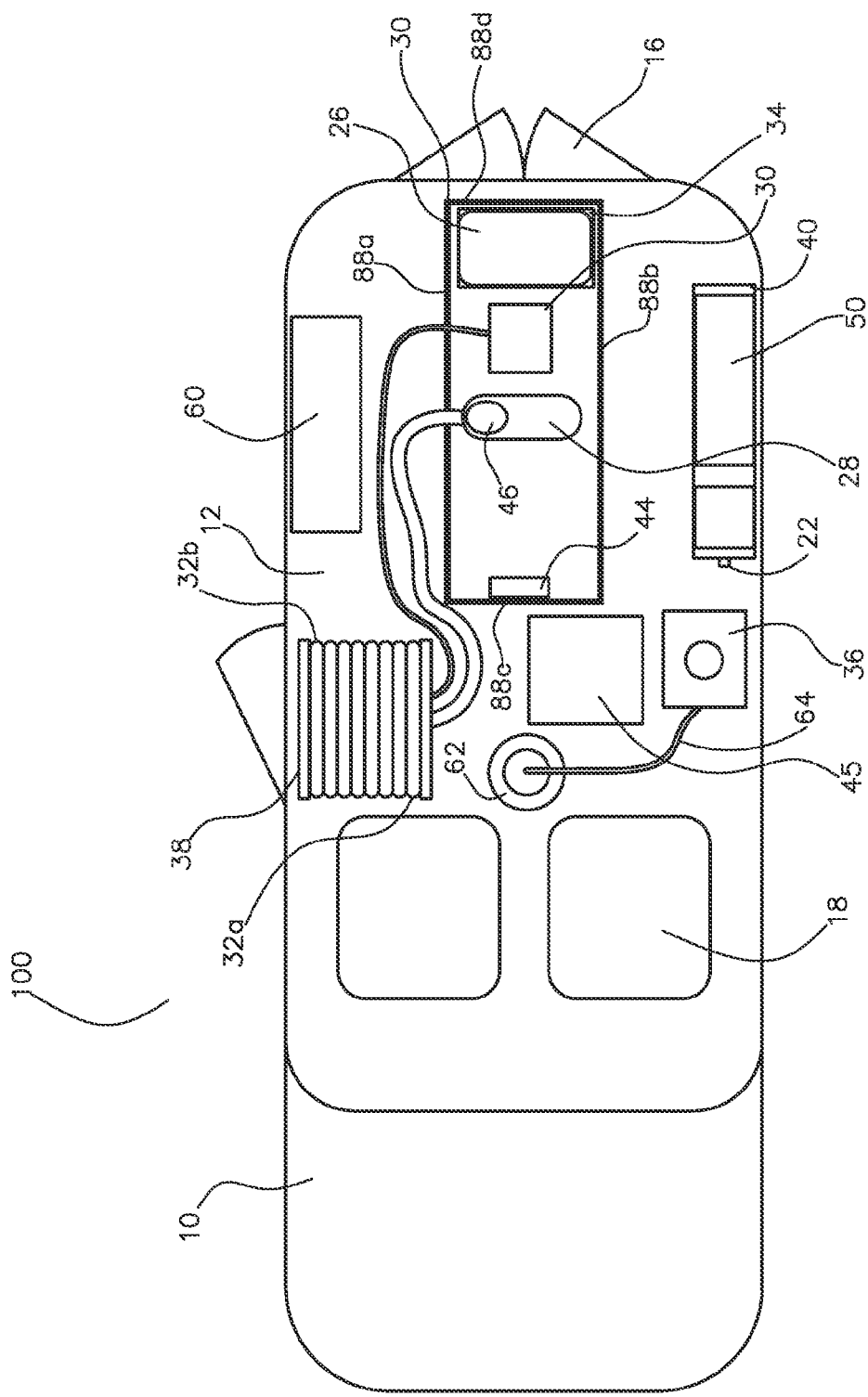
FIG. 2 shows a top perspective view of one embodiment of the mobile mounted steam system.
Figure 3:
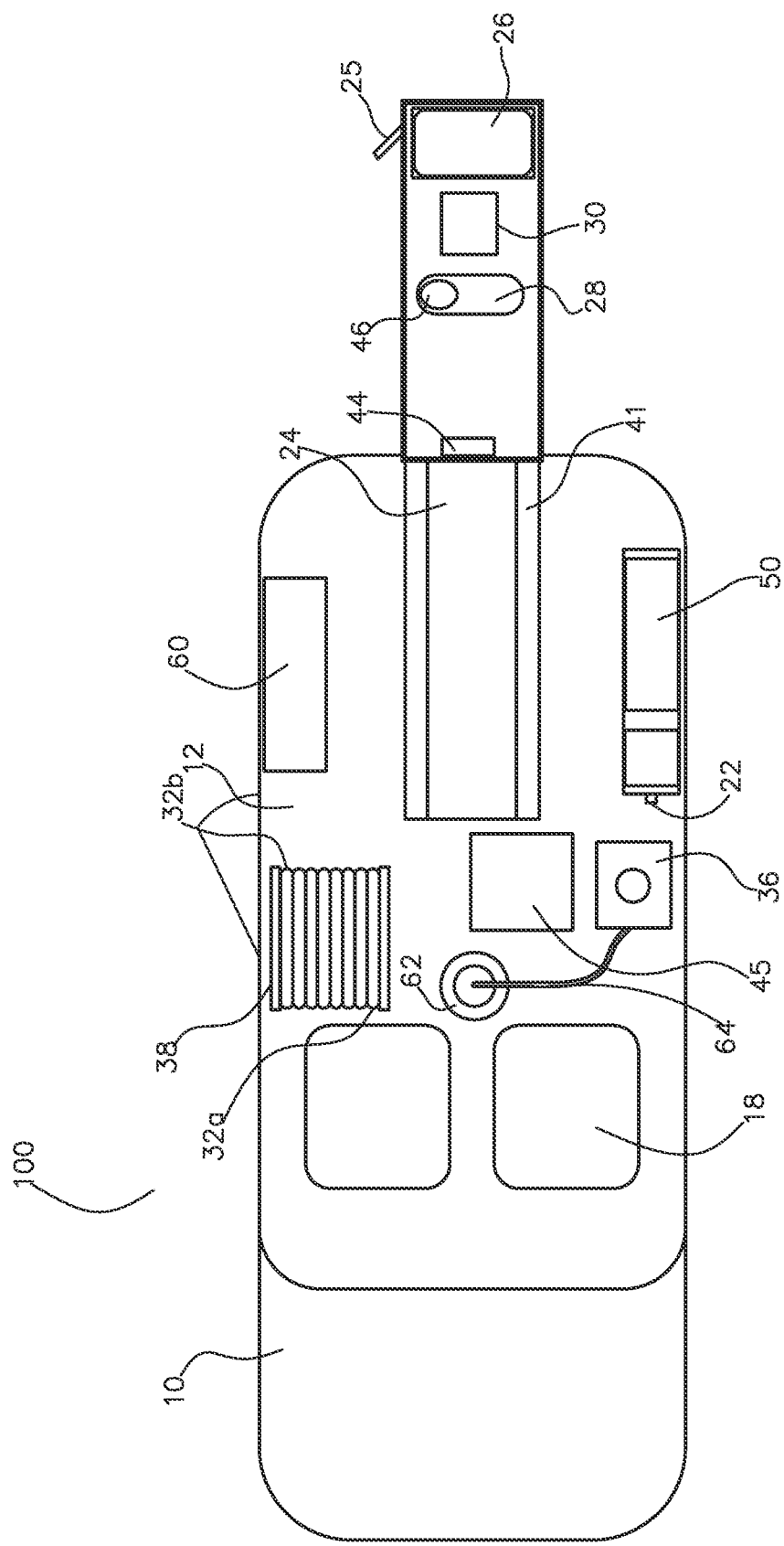
FIG. 3 shows a top perspective view of one embodiment of the mobile mounted steam system with sliding track mount fully extended.

In the embodiment shown, recovery tank 20 is positioned adjacent to sliding track mount 24, but may be placed in any position on or next to sliding track mount 24 and/or behind front seats 18 (shown in FIGS. 2 and 3). Recovery tank 20 may be any commercially available or specially manufactured recovery tank known in the art. In the embodiment shown, recovery tank is not larger than the following dimensions: 13 inches (width)×36 inches (length)×30 inches (height). Height is measured from the bottom of the tank surface which rests on the floor to the upper tank surface, but recovery tank may be of any dimensions adapted to fit on or adjacent to sliding track mount 24.

Also shown in the exemplary embodiment in FIG. 1 is reel assembly 38, which is a reel that may be mechanically or manually operated to wind or release pressure hose 32a and vacuum hose 32b. Reel assembly may be located in any accessible location in vehicle 10, can be positioned on other components of mobile mounted steam system to clean vehicles 100, or can be secured on the side or on top of vehicle 10.

Pressure hose 32a transfers cleaning solution and steam to carpet, upholstery and/or other surfaces during the steam cleaning process (which is a process known in the art.) Cleaning solution is drawn from clean solution tank 60. Vacuum hose 32b extracts water and cleaning solution carpet, upholstery and/or other surfaces. Pressure hose 32a and vacuum hose 32b are generally from 25 to 300 feet in length, but may be on any length, and may constructed from any rubber, plastic or synthetic material which can be adapted for forming a hose.

Clean solution tank 60 is a tank specifically manufactured and configured for use with mobile mounted steam system 100. In the exemplary embodiment, clean solution tank 60 holds 60 gallons of cleaning solution and is formed substantially in the dimensions o 24 inches by 32 inches by 24 inches. In alternate embodiments, clean solution tank 60 may be of varying proportions to meet the needs of a particular compact vehicle and may hold between 40 and 70 gallons of cleaning solution. Alternatively, in various embodiments clean solution tank 60 may be eliminated in favor of an external water source (to economize and/or save space). In the present embodiment, clean solution tank 60 is placed along one side and over a rear wheel of compact vehicle 10, but in alternate embodiments may, be alternately positioned in vehicle 10.

FIG. 2 illustrates heater 36, which is used to heat liquids in cleaning solution tank 60 during the steam cleaning process. In the exemplary embodiment, heater 36 is a Hotomatic® Gas Water Heater, as manufactured by Little Giant® Manufacturing Co., Inc. In the exemplary embodiment, heater 36 is powered by propane tank 62. Propane tank 62 is a conventional propane tank known in the art and is attached to heater 36 by propane tube 64, also conventionally known. In the exemplary embodiment, propane tank 62 is strapped to a corner of vehicle 10 for stability, but in other embodiments may be screwed, fastened or otherwise securely attached to vehicle 10 for added stability. In alternate embodiments, heater 36 may be any heater known in the art to heat cleaning solutions.

FIG. 2 is a top perspective view of mobile mounted steam system 100. Cat pump 30, which creates pressure for the steam cleaning process, appears on sliding track mount 24 (shown in FIGS. 1 and 3), and acts to pump water and provide water pressure to pressure hose 32*a*. Cat pump 30 is a commercially available cat pump known in the art. Cat pump 30 may be any cat pump having between 100 and 1200 PSI.

FIG. 2 also shows optional shelving 40, which holds cleaning products and other tools or attachments helpful in steam cleaning. In the exemplary embodiment, shelving 40 is secured over one rear wheel and is accessible from back door 16 or a side window. In alternate embodiments, shelving 40 may be located in any easily accessible location in vehicle 10; however, it is contemplated that clean solution tank 60 be secured substantially over one rear wheel and shelving 40 be secured over the opposite rear wheel.

In the embodiment shown in FIG. 2, vehicle 10 contains modified door 12, which is adapted to allow access to interior equipment and extension of sliding track mount 24. In the embodiment shown, modified door 12 is a sliding door, but may be a large OEM door or any other door known in the art.

In the embodiment shown in FIG. 2, back door 16 is a set of two cargo doors on both sides of the rear of vehicle 10 that open outward and allow easy access to components in mobile mounted steam system 100. In alternate embodiments, back door 16 may be any vehicle door known in the art, including a hatch back, a side-hinged door, or in particular embodiments of vehicle 10, back door 16 may be eliminated altogether.

In the embodiment shown in FIG. 2, drying fan 45 is positioned near back door 16. Drying fan 45 is a movable fan attached to vehicle 10 by a cord or other device and moved to the vehicle being cleaned to remove steam and moisture during cleaning. In the exemplary embodiment, drying fan 45 is powered by inverter 26, but in other embodiments may be powered by an external electrical source or with a battery.

FIG. 3 is a top perspective view of mobile mounted steam system 100 with sliding track mount 24 in an extended position outside vehicle 10 and supported on frame legs 25 or other structures. In the exemplary embodiment, frame legs 25 are a steel extension of sliding track mount 24 which can be extended when modified door 12 is open, and secured on flat pavement or ground. Once frame legs 25 are secured, sliding track mount 24 may be rolled out using track 41, where components may be cleaned or fixed. In the embodiment shown in FIG. 3, track 41 is a side mount linear guide system as manufactured by Danaher Motion. In alternate embodiments, track 41 may be any guide system capable of sustaining 500 pounds of load capacity.

Figure 4:
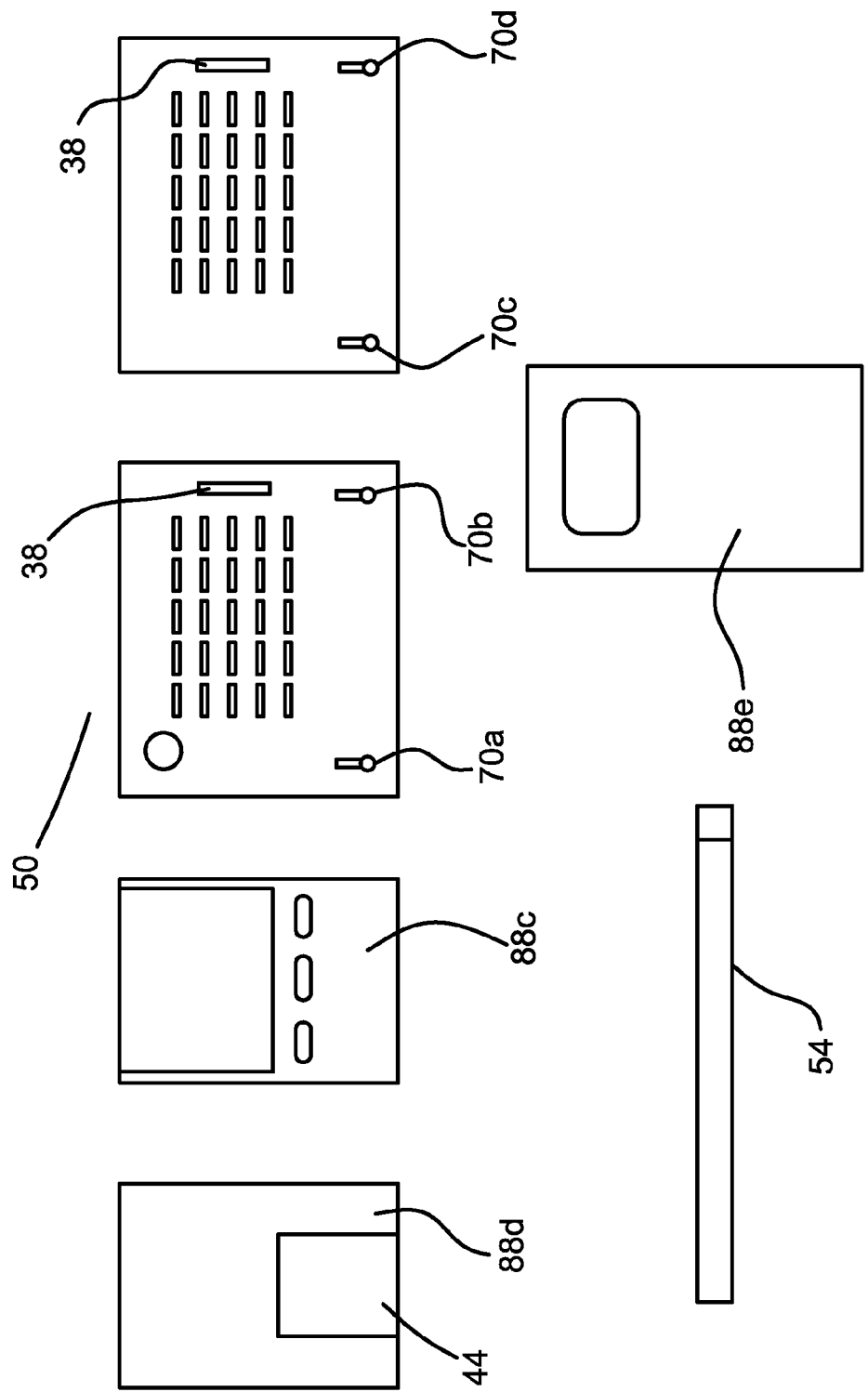
FIG. 4 shows an exploded view of one embodiment of a sheet metal cover for use with the mobile mounted steam system.

FIG. 4 shows various embodiments of sheet metal cover 50, which covers and protects components mounted on sliding track mount 24 (shown in FIGS. 1 and 3). In the embodiment shown, sheet metal cover 50 covers sliding track mount 24 completely and contains various opening slits for ventilation. Sheet metal cover 50 contains various panels, as shown in the embodiment in FIG. 4, including right panel 88*b* (shown in FIGS. 1 and 3), left panel 88*a* (shown in FIGS. 1 and 3), back panel 88*c*, front panel 88*d* and top panel 88*e*. As shown in the present embodiment, sheet metal cover 50 includes multiple attached panels that can be slidably moved to reach components of sliding track mount 24. In alternate embodiments, sheet metal cover 50 may be a continuous piece of bendable metal or may be made of hard plastics or composites.

FIG. 4 also shows optional handles (not shown), which in the exemplary embodiment are secured to left and right panels 88*a* and 88*b* and ergonomically designed to allow grip when moving sheet metal cover 50 or sliding track mount 24. In alternate embodiments, optional handles may be positioned in various locations on sheet metal cover 50 and may be of varying sizes. In the exemplary embodiment, optional propping tool 54 is also shown. During cleaning and maintenance, optional propping tool 54 can be used to prop up various panels on sheet metal cover 50.

FIG. 4 further shows security means 70*a-d*, which secures sliding track mount 24 from tampering and prevents injury which might be caused by people touching moving components. Alternate embodiments may include a single lock. Security means 70*a-d* may be a lock, combination, touch pad, alarm, scanner or any other security means known in the art to prevent access, injury, theft, alteration and/or tampering of settings.

What is claimed is:

1. A steam cleaning apparatus comprised of:
   a vehicle to which a sliding track mount for supporting and securing components of a steam cleaning apparatus has been centrally mounted relative to the rear door of a vehicle, said sliding track mount having a front end extending towards the front of said vehicle and a rear end extending towards the rear of said vehicle and able to extend parallel to said vehicle out said rear door;
   an engine mounted to said rear end of said sliding track mount;
   an inverter positioned adjacent to said engine and powered by said engine;
   a cat pump mounted to said sliding track mount frontal relative to said engine, said cat pump providing between 100 and 1,200 psi;
   a vacuum blower powered by said inverter for extracting water mounted to said sliding track mount frontal relative to said cat pump, said vacuum blower including a silencing means;
   an exhaust fan mounted to said front end of said mounting track frame to release heat through the floor of said vehicle;
   at least one clean solution tank mounted on said vehicle adjacent to said sliding track frame over a rear wheel of said vehicle;
   at least one recovery tank with a dump valve mounted on said vehicle adjacent to said sliding track frame and configured to receive waste water from said vacuum blower;

at least one hose and reel assembly mounted on said vehicle adjacent to a side door of said vehicle, said hose and reel assembly comprising
    at least one pressure hose pressured by said cat pump to draw cleaning solution from said clean solution tank, and
    at least one vacuum hose powered by said vacuum blower to extract waste water, and
at least one propane tank with a propane tube securely mounted on said vehicle adjacent to said front end of said sliding track frame; and
hose; and
at least one heater mounted on said vehicle adjacent to said frontal end of said sliding track frame in proximity to said propane tank, said heater powered by said propane tank and connected to said propane tank by said propane tube.

2. The apparatus of claim 1 wherein said engine is a two-cycle engine.

3. The apparatus of claim 1 which further includes at least one drying fan.

4. The apparatus of claim 1 which further includes at least one frame leg.

* * * * *